Aug. 26, 1941.   C. R. TOWNSEND ET AL   2,253,824
CASTER FOR APPLICATION TO VEHICLES
Filed Feb. 8, 1940   2 Sheets-Sheet 1
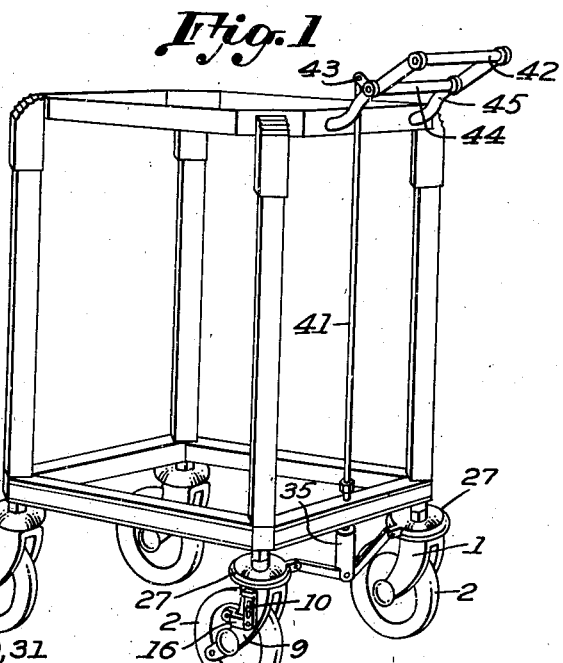
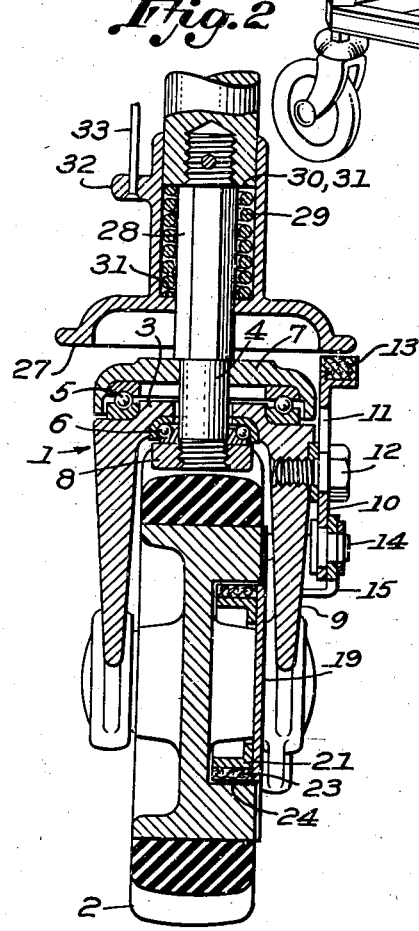
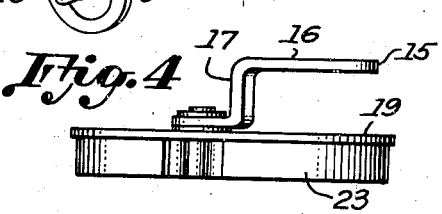
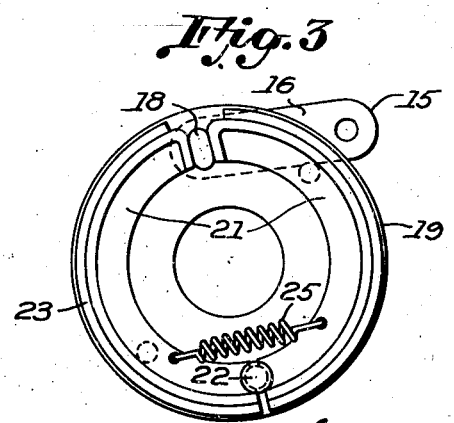
Inventors.
CHARLES RALPH TOWNSEND
CLAUDE MORTIMER TOWNSEND
By
their Attorney.

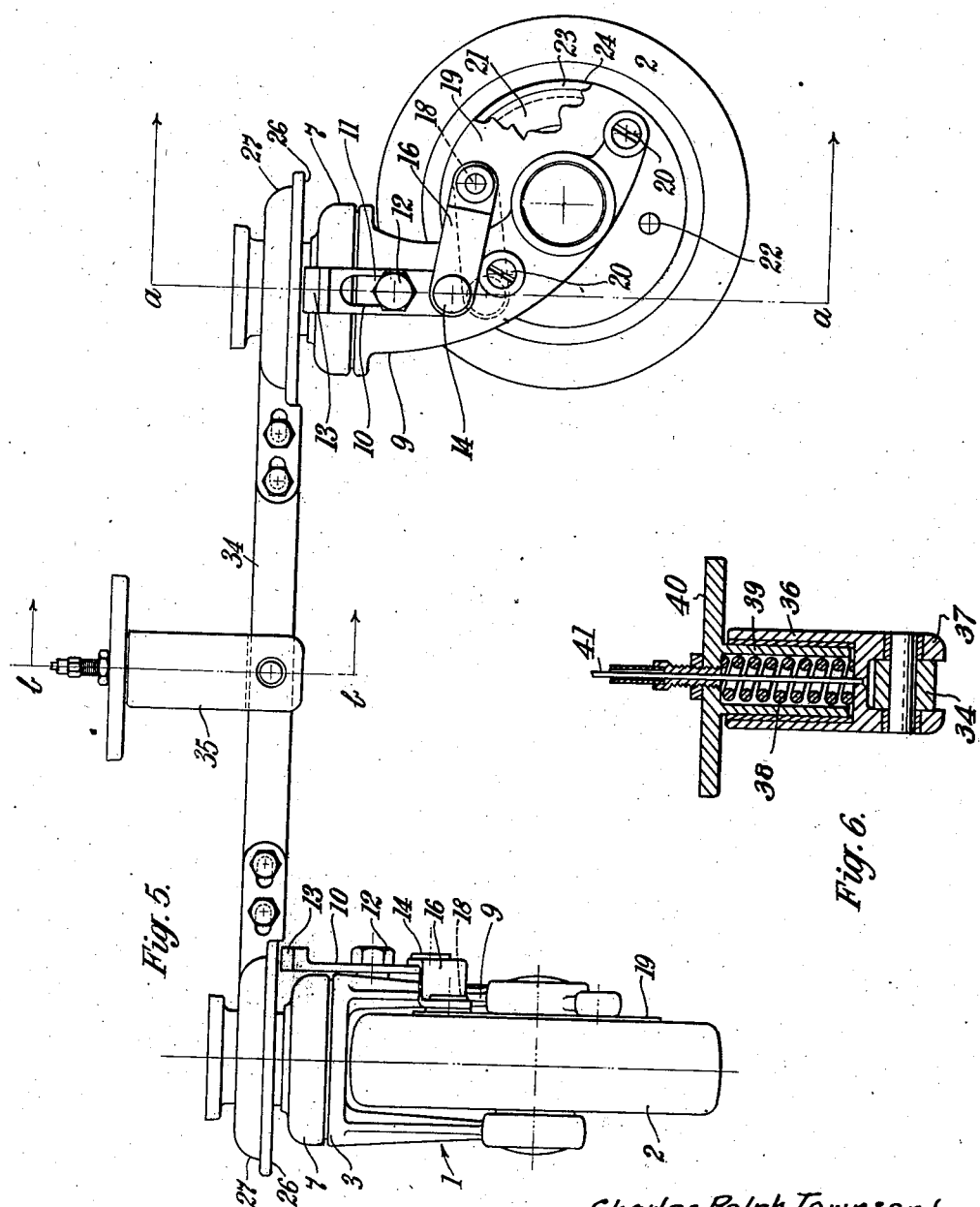

Patented Aug. 26, 1941

2,253,824

UNITED STATES PATENT OFFICE 2,253,824

CASTER FOR APPLICATION TO VEHICLES

Charles Ralph Townsend and Claude Mortimer Townsend, Birmingham, England

Application February 8, 1940, Serial No. 317,919 In Great Britain February 3, 1939

5 Claims. (Cl. 16—35)

This invention relates to a swivelling caster of the kind in which the swivelling of the caster and the revolution of its wheel are braked simultaneously by means of a single control device.

In this kind of caster it has been proposed to brake on the periphery of the wheel by a spoon-shaped arm, and on the swivelling member by engaging tooth surfaces provided in stationary and swivelled parts, both moved simultaneously by foot operation such as from a pedal. Apart from mechanical and other disadvantages, this known arrangement of braking mechanism does not admit of two or more casters being coupled to achieve the desideratum of collective and simultaneous braking of the swivellings and revolutions of the wheels.

The primary object of the invention is to provide a caster having improved brake mechanism and operating means therefor and also to provide in a simple and inexpensive manner for the collective and simultaneous braking of two or more casters especially, but not exclusively, under "dead man's" control means.

The invention comprises the combination of parts hereinafter particularly described with reference to the accompanying explanatory drawings and specifically referred to in the appended claims.

Fig. 1 is a perspective view of a trolley fitted with casters and control means according to the invention.

Fig. 2 is a vertical section taken on the chain-lines a, a, Fig. 5, the braking member being illustrated in its application to a single caster. Fig. 2 represents a modified form of the brake operating means as illustrated in Fig. 5.

Fig. 3 is a detail of the brake shoes and associated elements.

Fig. 4 is an elevation of Fig. 3.

Fig. 5 is a side elevation on a larger scale of a pair of casters whose braking members are coupled by a bar for collective and simultaneous operation as in Fig. 1.

Fig. 6 is a vertical section of Fig. 5, taken on the chain-line b, b.

The caster embodies a body or fork 1, carrying a wheel 2, swivelled by its crown 3 on the lower end of a caster peg 4, anti-frictional ball bearings 5, 6, being provided between the crown 3 and a cap 7 and between the crown 3 and a fixing nut 8. Mounted on the outer side of one of the branches 9 of the swivelled fork 1 is a vertically slidable bar 10 slotted at 11 for engagement with the guide pin 12 screwed into this branch. This bar has a brake pad 13 at its upper end while its lower end is jointedly connected at 14 to one end 15 of a lever 16 which lies closely against said branch 9, the other end 17 of said lever being cranked inwardly and fixedly carries a cam 18, a shank of which has a bearing in a stationary face plate 19 secured to the branch 9 by pins 20. Said cam 18 is interposed between ends of a pair of brake shoes 21, pivoted at 22 on said face plate, and whose friction linings are adapted to be expanded into engagement with a braking annulus 24 of the caster wheel 2 against the action of a tension spring 25.

The brake pad 13 co-operates with the circular friction face 26 of a braking member 27 concentrically mounted about the caster peg 4 so that said member 27 is capable of linear movement in a vertical plane and is constrained against rotation by means of positive engagement with a hexagon or other non-circular shank 28 forming an immovable extension of said peg.

In the brakes "off" position, Fig. 2, the braking member 27 is displaceable against the action of a compression spring 29 arranged concentrically about the hexagon shank 28 in a sleeved extension of the braking member and abutting against shoulders, 30, 30.

A lug 32 on said sleeve forms an anchorage for an end of a cable 33 of the "Bowden" type, adapted to be connected to manually operated means.

In Fig. 5, two brake members 27, each associated with a caster and brake mechanism as previously described, are coupled by a bar 34 on which is mounted a control device 35 common to both braking members 27 so that they are operated collectively and simultaneously. This control device embodies a socket 36 pivotally mounted on the bar 34 by its forked end 37 and adapted to slide against the action of a compression spring 38 over the inverted socket 39 whose mounting plate 40 is adapted to be anchored to the chassis of a trolley. An end of a "Bowden" cable 41 is connected to the base of the socket 36 and the other end is adapted to be connected to an operating member.

The application of the coupled brake member system is shown applied to the trolley, Fig. 1, the bar 34 being bent. This trolley is advantageously provided with a pivoted handle 42 operating on the so-called "dead man" principle, in that when it is released by the operator, dual braking on both casters is automatically effected and when moved downwardly in the act of pushing the trolley along, the dual brakes are released and are so maintained until the operator takes his hand off the handle.

The cable or equivalent rod 41 is shown connected at its upper end to a crank 43 fastened to a cross bar 44 which rotates with the handle 42 on the brackets 45; normally the handle is elevated through the cable by the energy of the spring 38.

In the brakes operating position, Fig. 1, the energy of the spring 38 pushes the socket 36 downwardly and also the coupling bar 34 whereby the braking members 27 press against the brake pads 13 and brake the swivelling movement of the casters. Simultaneously the sliding bars 10, which carry said pads, are caused to move downwardly, whereby an angular movement (indicated by the chain lines on the righthand caster, Fig. 5) is imparted to the levers 16 and the brake-shoe operating cams 18 are partially rotated pressing the shoes 21 against the braking annuli 24 of the wheels. When the handle 42 is pressed downwardly, the cable positively draws the socket 36 upwardly against its spring 37 and with it the coupling bar 34, so that the coupled brake members 27 are raised simultaneously and the contracting action of the spring 25 on the brake shoes 21 transmits rotary movement in the reverse direction to the cam 18 and thus raises the levers 16 and the operating slidable bars 10, as seen in Fig. 5.

Having now described our invention what we claim and desire to secure by Letters Patent is:

1. A swivelling caster of the type referred to, comprising a support to be fixed to a carriage; a forked-body swivellingly mounted on said support; a caster wheel mounted within the fork of the body upon a horizontal axle of the wheel; braking means for the wheel arranged concentrically within the structure thereof; a braking member having a circular friction face concentric with the swivel axis of said support, said member being capable of vertical movement on said support and being held from rotation; and means arranged upon the forked body and connected to the braking means to actuate the same, said last means being disposed in the path of movement of the friction face of the braking member, whereby movement of the latter against the said last means will apply the braking means and prevent movement of the wheel.

2. A swivelling caster of the type referred to, comprising a caster peg to be fixed to a support in vertical position; a forked-body swivellingly mounted about the lower end of said peg; a caster wheel mounted within the fork of the body upon a horizontal axle; braking means for the wheel comprising a brake-band arranged concentrically within the structure thereof; a braking member having a circular friction face concentric to said peg and being capable of vertical movement on the peg and being held from rotation; a spring for automatically moving the braking member in one direction; and means arranged upon the forked body and operatively connected to the brake-band to actuate the same, said means being disposed in the path of movement of the friction face of the braking member, whereby under spring pressure the latter causes the brake-band to be normally applied to the wheel.

3. A caster as claimed in claim 2 in which said means on the forked body comprises a slidable bar; a brake pad secured to the upper end of said bar facing said circular friction face and a lever to operate the brake-band having one end operating the latter and the other being pivotally connected to the lower end of said bar.

4. A caster as claimed in claim 2 in which said caster peg shank is of a polygon transverse section, whereby said braking member is guided in its movement longitudinally on said shank and prevented from rotary movement.

5. A caster as claimed in claim 2 in which said spring is normally compressed and rests on and tends to force said braking member in a downwardly direction to engage and actuate the means arranged on the fork to apply the brake band.

CHARLES RALPH TOWNSEND.
CLAUDE MORTIMER TOWNSEND.